No. 666,655. Patented Jan. 29, 1901.
T. W. EATON.
ELECTRIC MOTOR CONTROLLER FRAME AND METHOD OF CONSTRUCTING SAME.
(Application filed Oct. 8, 1900.)
(No Model.) 4 Sheets—Sheet 2.
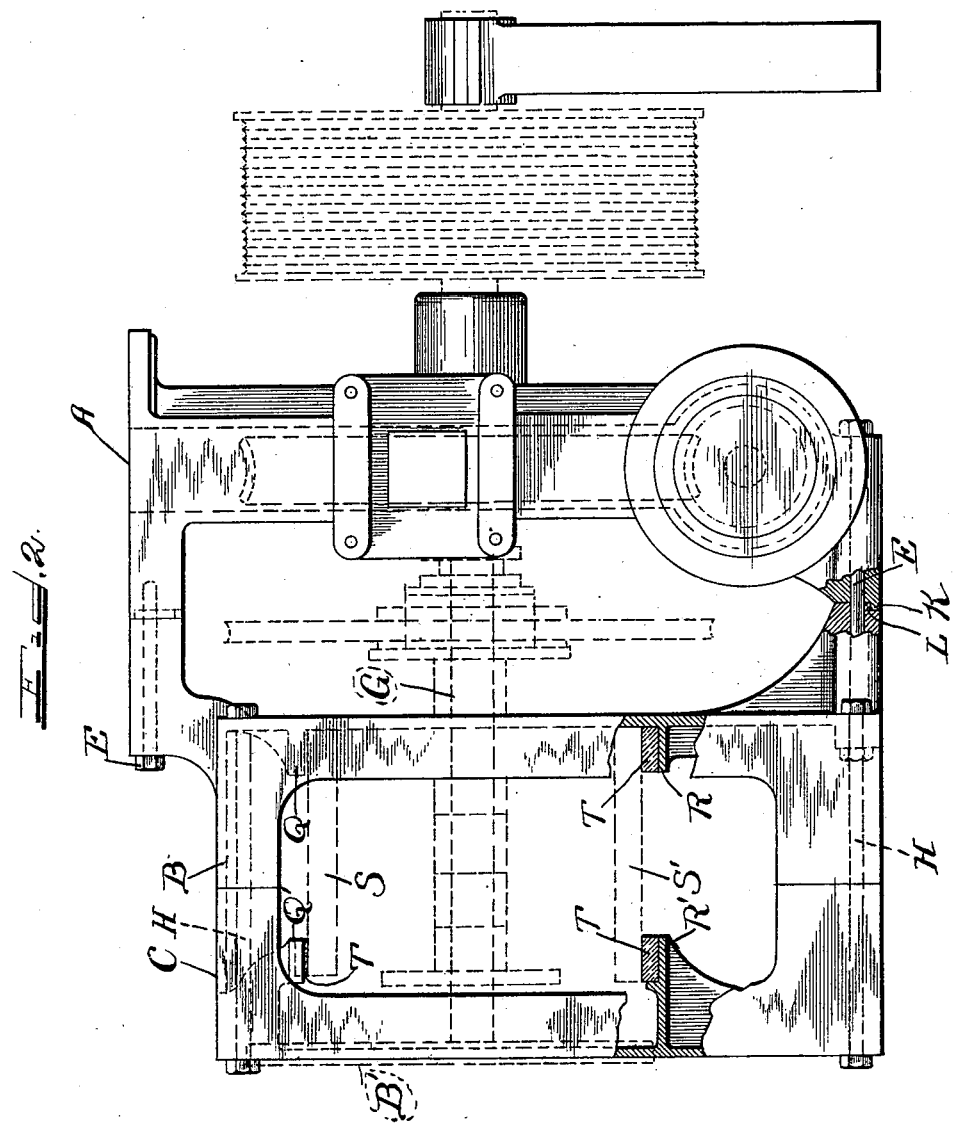

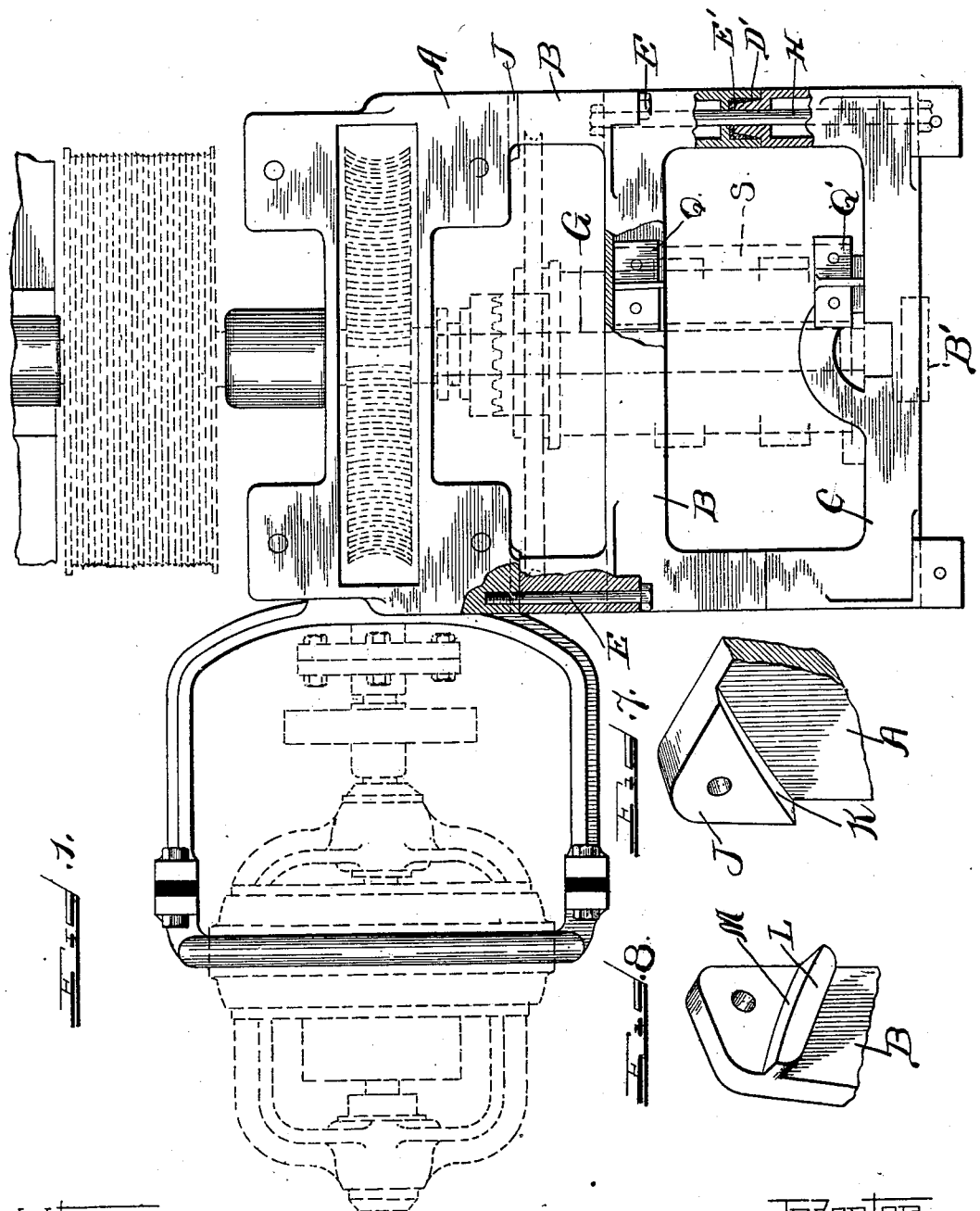

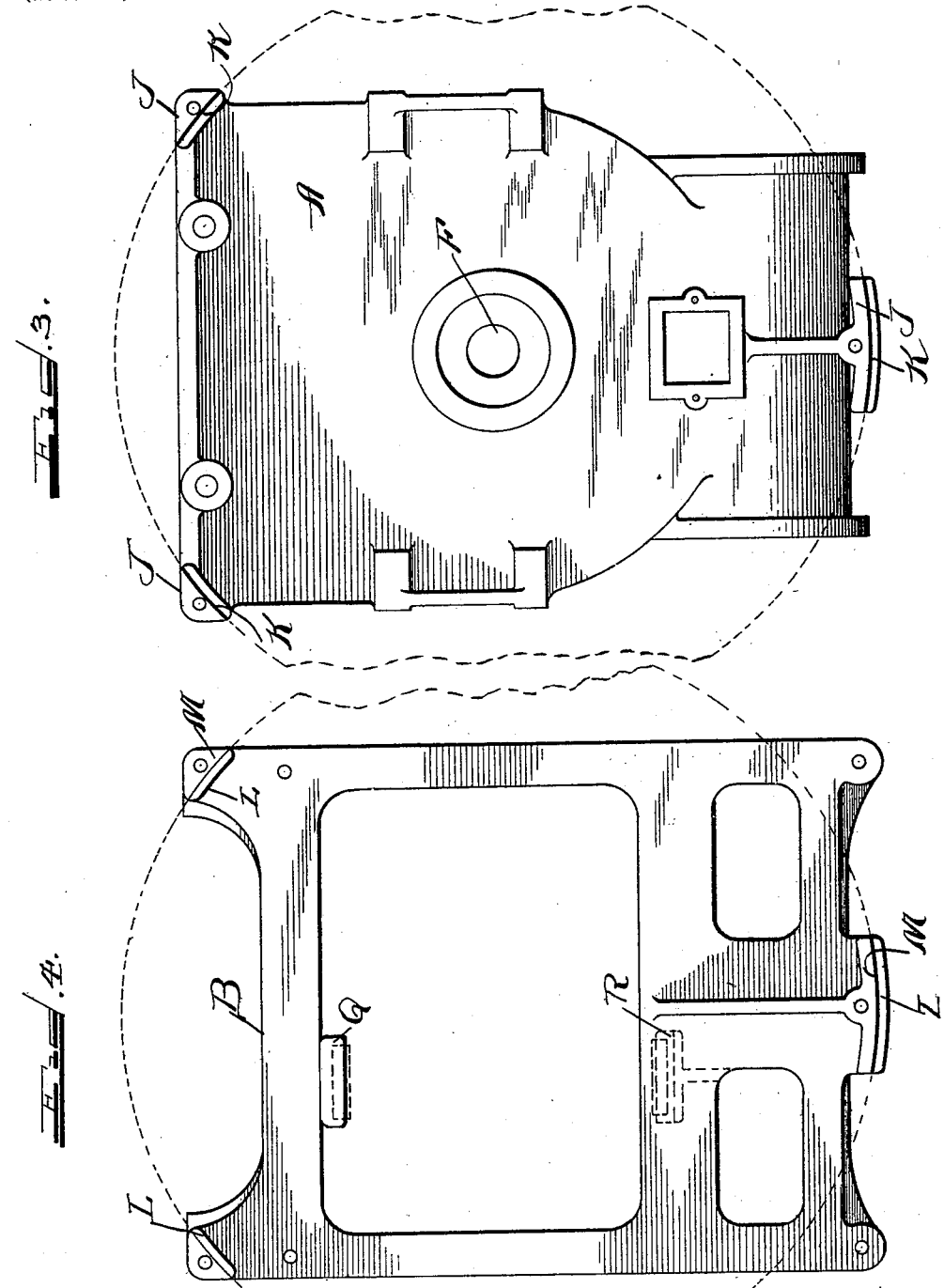

No. 666,655. Patented Jan. 29, 1901.
T. W. EATON.
ELECTRIC MOTOR CONTROLLER FRAME AND METHOD OF CONSTRUCTING SAME.
(Application filed Oct. 8, 1900.)
(No Model.) 4 Sheets—Sheet 4.
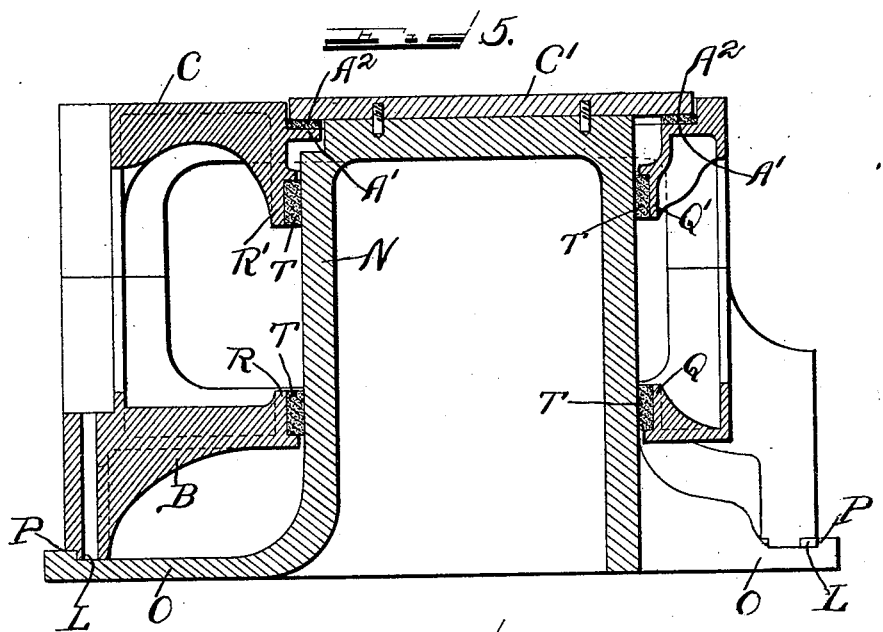
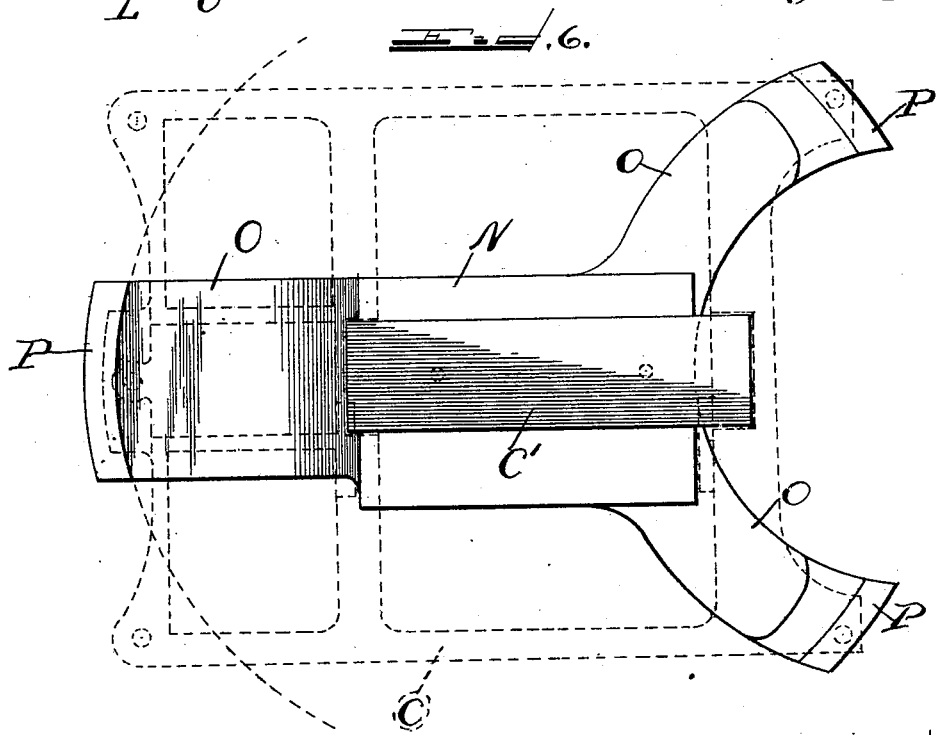

UNITED STATES PATENT OFFICE.

THOMAS W. EATON, OF CHICAGO, ILLINOIS, ASSIGNOR TO THE EATON & PRINCE COMPANY, OF SAME PLACE.

ELECTRIC-MOTOR CONTROLLER-FRAME AND METHOD OF CONSTRUCTING SAME.

SPECIFICATION forming part of Letters Patent No. 666,655, dated January 29, 1901.

Application filed October 8, 1900. Serial No. 32,414. (No model.)

*To all whom it may concern:*

Be it known that I, THOMAS W. EATON, a citizen of the United States, residing at Chicago, in the county of Cook and State of Illinois, have invented new and useful Electric-Motor Controller-Frames and Method of Constructing Same, of which the following is a specification.

This invention relates to electric-motor controller-frames and the method of constructing the same.

One object of the invention is to provide a controller-frame which is simple in construction and inexpensive in manufacture and which can be readily and easily assembled.

A further object is to provide a construction of sectional controller-frame the parts or sections of which can be made up in quantities and when assembled will always bear a definite relation to each other.

A further object is to provide a construction of controller-frame wherein the stationary-contact-supporting plates will always occupy a definite relation to each other when the controller-frame is assembled.

A further object is to provide a method of construction of controller-frames whereby the parts thereof may be produced expeditiously and economically and when assembled will occupy definite relation to each other and to the mechanism driven by the motor.

Other objects of the invention will appear more fully hereinafter.

The invention consists, substantially, in the construction, combination, location, arrangement, and mode of operation, all as will be more fully hereinafter set forth, as shown in the accompanying drawings, and finally pointed out in the appended claims.

Referring to the accompanying drawings and to the various views and reference-signs appearing thereon, Figure 1 is a plan view, parts being broken out and parts in section, of a controller-frame embodying the principles of my invention, showing the application thereof to the hoisting-motor of an elevator. Fig. 2 is an elevation taken from the right of Fig. 1, parts being broken out and parts in section. Fig. 3 is a face view of the part of the controller-frame which is secured to or forms part of the framework of the machine. Fig. 4 is a similar view of the coöperating face of the adjacent part or section of the controller-frame. Fig. 5 is a view in longitudinal section of two parts of the controller-frame applied to a jig for the purpose of providing the same with absolutely true supporting-surfaces for the contact-supporting plates and which surfaces bear a definite and fixed relation to each other and to the controller-shaft. Fig. 6 is a plan view of the jig, showing in dotted lines the parts of the controller-frame applied thereto. Fig. 7 is a detached broken detail view in perspective of an engaging corner of the section or part of the controller shown in Fig. 3. Fig. 8 is a similar view of the coöperating engaging corner of the section or part of the controller-frame shown in Fig. 4.

The same part is designated by the same reference-sign wherever it occurs throughout the several views.

In carrying out my invention I form the controller-frame in sections or parts, (indicated at A, B, and C, respectively.) These sections or parts may be in the form of castings, and the part A is designed, when assembled, to be bolted or otherwise secured to or form part of the frame of the machine and is provided with a journal-bearing (indicated at F, Fig. 3) for the shaft (indicated in dotted lines at G) upon which the movable contacts of the controller are mounted. The casting B is designed to be placed face to face with respect to the casting A and to be bolted thereto, as indicated at E, and the casting C is designed to be bolted to the section or casting B, the securing-bolts being indicated at H. By thus making the controller-frame in detachable sections or parts I facilitate and greatly cheapen the manufacture thereof, and, moreover, the controller for electric motors requires frequent attention and repair, and in the former constructions it has been difficult to gain ready access to the parts of the controller requiring attention, adjustment, or repair; but with the construction above described access may be readily gained by merely removing one or more of the sections of the frame.

It is important and desirable that the controller be held in fixed relation to the machine and when the controller-frame is once adjusted in position that it may be taken apart and replaced in exactly the same position and relation to the other parts. To accomplish this result and to provide means whereby the castings or parts A B whenever assembled or secured together will always occupy the same relative position, I provide the casting A with lugs or projections J. The casting A is then placed in a lathe or other suitable machine, and shoulders K are turned on the lugs or projections J, as indicated most clearly in Fig. 7, all the shoulders K being turned or trued to a definite radius and concentric with the axis of shaft G. On the casting B, I provide coöperating flanges or projections L, (see Fig. 8,) the surfaces M of which are turned or trued in a similar manner to the same radius and concentric relation as the surfaces of shoulders K, as clearly indicated in dotted lines in Figs. 3 and 4, so that when the casting B is applied to casting A face to face the shoulders K will be engaged by and will bear against the surfaces M of flanges L, as clearly shown in a sectional part of Fig. 2. By constructing the castings A and B in this manner and turning or truing the engaging flanges and shoulders thereof to exactly the same radius said castings may be made up in quantities and may be carried in stock as uniform or standard parts, and when these parts are assembled into a finished or complete frame they will always be brought into fixed, definite, and centered relation, or when the part B is detached for any purpose and is again placed in position it will be brought to the same centered relation with respect to the castings A and of the controller-shaft.

In the construction of controllers it is important that the fixed contacts shall occupy an absolutely true relation or position with respect to the movable contacts. This desirable result has been difficult of attainment heretofore and has necessitated careful and expensive machine-work in producing true supporting-surfaces for the contact-carrying slabs or plates, and even this expensive method is not always satisfactory, especially where the controllers are frequently taken apart for repair and then reassembled. In such cases it requires the greatest of care and nicety of adjustment to bring the slabs or plates which support the fixed contacts into the same position and relation with respect to each other and to the movable contacts that they originally occupied. In carrying out my invention I secure the desired objects and results most efficiently and economically in the following manner: The parts or castings B C, upon which are mounted the contact carrying or supporting slabs or plates, when bolted together are placed in inverted position upon a jig N. (See Figs. 5 and 6.) This jig is provided with feet O, having flanges or shoulders P formed upon the same radius as and with which flanges L of casting B engage. In this manner I insure the proper centered relation of the controller-frame sections B C which said sections will occupy in the completed construction when assembled upon casting or section A. In the casting of sections B and C said sections are provided or formed with seats Q R Q' R', respectively, upon which seats are supported the ends of the slabs or plates indicated in dotted lines at S S' (see Fig. 2) and which carry the fixed contacts of the controller. The supporting-surfaces of these seats are usually rough and uneven when the castings come from the molds and require expensive handling and fine machine-work to reduce them to uniform and standard dimension or relation. This handling and machine-work adds greatly to the cost of manufacture, as above explained, and, moreover, it is difficult to secure absolute uniformity in the surfaces of seats R R', upon which rest the ends of slab S', or of seats Q Q', upon which rest the ends of slab S, so as to bring the contacts supported by said slabs into proper and fixed relation with respect to each other and to the path of the movable contacts, even when the greatest care and the most skilled work is employed. In order to avoid this expensive handling and machine-work and still secure absolute uniformity, I do not attempt to plane down the seats Q Q' R R' or to reduce the roughness or inequality thereof through machine-work; but I assemble these sections B C in proper and exact centered relation upon the jig N, as above explained, and then fill up the seats Q Q' R R' with Babbitt metal or other suitable material, as indicated at T, the adjacent bearing-surface of the jig forming an absolutely true relation between the surfaces which receive the contact-slabs and insuring that the slabs will always be brought into the same position and relation whenever the castings B C are assembled. In the same manner the bearings A', which receive the slab or plate B', upon which are carried the contacts through which the circuit resistances are controlled, are brought to uniform relation without planing or other machine-work by filling the same with Babbitt metal or other suitable material, as indicated at $A^2$, Fig. 5, the jig-plate C' forming the means for securing the desired uniformity.

In order to efficiently bolt or otherwise secure the castings B C together in assembled relation and in such relative position that when said parts are separated and again assembled they will be brought into the same relation, the meeting surface of section C is provided with projections D', adapted to enter seats formed in the adjacent surface of section B, said seat being lined with Babbitt metal, as indicated at E'. In this manner the sections are always assembled in the same relation.

The parts of the controller proper are only indicated in dotted lines, as the invention relates only to the construction of the controller-frame.

I have shown my invention as applied to the hoisting mechanism for elevators, the hoisting mechanism being indicated in dotted lines; but it is obvious that the principles of my invention are equally applicable to controllers for other uses and in other relations. I do not desire, therefore, to be limited or restricted in respect of the application of my invention.

It will be readily understood that in the manner above set forth I produce a most efficient controller-frame and in a most economical manner and wherein the various parts may be constructed in quantity and carried in stock and when assembled or when taken apart for repair and again put together will always occupy the same position and relation with respect to each other.

It is obvious that many changes and variations in the details of construction, arrangement, and procedure would readily suggest themselves to persons skilled in the art and still fall within the spirit and scope of my invention. I do not desire, therefore, to be limited or restricted to the exact details shown and described; but, Having now set forth the object and nature of my invention and a construction and mode of procedure embodying the principles thereof, what I claim as new and useful and of my own invention, and desire to secure by Letters Patent, is—

1. In the construction of motor controller-frames, the method which consists in first forming the frame in sections and with coöperating engaging parts and supporting-surfaces, then assembling the sections with the engaging parts thereof in truly-centered relation, and finally truing the supporting-surfaces of said sections with reference to each other, as and for the purpose set forth.

2. In the construction of motor controller-frames, the method which consists in casting the frame in sections and with coöperating engaging parts and supporting-surfaces, then assembling the cast sections with the engaging parts thereof in truly-centered relation, and finally applying Babbitt metal or other suitable material to the supporting-surfaces of said sections, whereby said supporting-surfaces are trued with respect to each other, as and for the purpose set forth.

3. In the construction of motor controller-frames, the method which consists in casting the frame in sections, and providing each section with engaging parts, and supporting-seats, then assembling said sections with said coöperating engaging parts in truly-centered relation, and finally applying Babbitt or other suitable metal to said supporting-seats to aline the supporting-surfaces thereof in fixed relation with respect to each other, as and for the purpose set forth.

4. In the construction of motor controller-frames, the method which consists in forming the frame in sections, and with engaging projections and supporting-seats, then turning said engaging projections to a common radius, then assembling said sections in truly-centered relation, and finally filling said supporting-seats to truly-alined surfaces, as and for the purpose set forth.

5. As a new article of manufacture, a motor controller-frame made in sections each section having a supporting-surface arranged to coöperate with a supporting-surface on the other section to receive a contact-plate, said sections adapted to be assembled in truly-centered relation, as and for the purpose set forth.

6. As a new article of manufacture, a motor controller-frame made in sections, said sections coöperating with supporting-surfaces, and having registering engaging parts formed in uniform relation, whereby when said sections are assembled the parts thereof and said supporting-surfaces occupy fixed and definite centered relation with respect to each other, as and for the purpose set forth.

7. As a new article of manufacture, a motor controller-frame made in sections, one of said sections provided with shoulders and another of said sections provided with coöperating engaging flanges, said shoulders and flanges being turned to truly concentric relation, whereby when said sections are assembled they occupy truly-centered relation, as and for the purpose set forth.

8. As a new article of manufacture, a motor controller-frame made in sections, said sections having registering engaging parts formed in uniform relation whereby when said sections are assembled they occupy fixed and definite center relation with respect to each other, one of said sections provided with supporting-seats arranged, when said sections are assembled, to coöperate with corresponding seats provided on the other section, as and for the purpose set forth.

9. As a new article of manufacture, a motor-controller-frame casting, having seats to receive contact-supports, said seats being filled to uniform or alined supporting-surfaces, as and for the purpose set forth.

10. As a new article of manufacture, a motor-controller-frame casting made in sections, said sections provided with coöperating supporting-seats to receive the contact-supports, said seats being filled to true alinement of the supporting-surfaces thereof while the sections are maintained in truly-centered relation, as and for the purpose set forth.

11. As a new article of manufacture, a controller-frame having engaging lugs turned to truly concentric relation, whereby said frame may be supported in centered position upon the frame of the machine, as and for the purpose set forth.

In witness whereof I have hereunto set my hand, this 1st day of October, 1900, in the presence of the subscribing witnesses.

THOMAS W. EATON.

Witnesses:
FRANK T. BROWN,
S. E. DARBY.